United States Patent

Toyota et al.

(10) Patent No.: US 10,513,182 B2
(45) Date of Patent: Dec. 24, 2019

(54) VEHICLE DISPLAY APPARATUS

(71) Applicant: DENSO CORPORATION, Kariya, Aichi-pref. (JP)

(72) Inventors: Masashi Toyota, Kariya (JP); Satoru Tamura, Kariya (JP); Katsumi Fujita, Kariya (JP); Seigo Tane, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 189 days.

(21) Appl. No.: 15/736,211

(22) PCT Filed: Jun. 16, 2016

(86) PCT No.: PCT/JP2016/002907
§ 371 (c)(1),
(2) Date: Dec. 13, 2017

(87) PCT Pub. No.: WO2017/010044
PCT Pub. Date: Jan. 19, 2017

(65) Prior Publication Data
US 2018/0178651 A1 Jun. 28, 2018

(30) Foreign Application Priority Data

Jul. 16, 2015 (JP) .................................. 2015-142166

(51) Int. Cl.
*B60K 37/02* (2006.01)
*B60K 35/00* (2006.01)
(Continued)

(52) U.S. Cl.
CPC .............. *B60K 37/02* (2013.01); *B60K 35/00* (2013.01); *B60Q 3/14* (2017.02); *B60Q 3/64* (2017.02);
(Continued)

(58) Field of Classification Search
CPC ........ G02F 2001/133374; B60K 35/00; B60K 2370/1531; B60K 2370/154;
(Continued)

(56) References Cited

U.S. PATENT DOCUMENTS

2002/0001183 A1* 1/2002 Shigehiro .............. G01D 11/28
362/23.01
2014/0240953 A1 8/2014 Mori
(Continued)

FOREIGN PATENT DOCUMENTS

CN 103930295 A 7/2014
CN 104100924 A 10/2014
(Continued)

*Primary Examiner* — Anh T Mai
*Assistant Examiner* — Steven Y Horikoshi
(74) *Attorney, Agent, or Firm* — Harness, Dickey & Pierce, P.L.C.

(57) ABSTRACT

A vehicle display apparatus includes an image display panel, a backlight, and a translucent plate. The image display panel displays an image in a display area. The backlight emits a light in a direction from a back surface of the image display panel toward the display area. The translucent plate has a plate shape and is disposed between the image display panel and the backlight. The translucent plate transmits the light emitted from the backlight. The translucent plate has a three-dimensional indicator configured to be visually recognized through the image display panel, and a periphery portion of the translucent plate is disposed out of the display area.

5 Claims, 4 Drawing Sheets

(51) Int. Cl.
  *G01D 11/28* (2006.01)
  *G01D 13/02* (2006.01)
  *B60Q 3/14* (2017.01)
  *B60Q 3/64* (2017.01)

(52) U.S. Cl.
  CPC .............. *G01D 11/28* (2013.01); *G01D 13/02* (2013.01); *B60K 2370/152* (2019.05); *B60K 2370/1531* (2019.05); *B60K 2370/20* (2019.05); *B60K 2370/27* (2019.05); *B60K 2370/34* (2019.05); *B60K 2370/347* (2019.05)

(58) Field of Classification Search
  CPC ........ B60K 2370/736; B60K 2370/027; B60K 2370/028; B60K 2370/152; B60K 2370/341; B60K 2370/347; B60K 37/02; G09F 13/08; G09F 2013/185; G09F 2013/1863; G01P 1/08–11; Y10S 116/05; G01D 13/18; G01D 11/28; B60Q 3/10; B60Q 3/12; B60Q 3/14
  See application file for complete search history.

(56) References Cited

U.S. PATENT DOCUMENTS

2014/0376262 A1  12/2014  Ogawa et al.
2016/0291234 A1  10/2016  Qiu

FOREIGN PATENT DOCUMENTS

| JP | 2006349352 A | 12/2006 |
| JP | 4787102 B2 | 10/2011 |
| JP | 2012117894 A | 6/2012 |
| JP | 2015007586 A | 1/2015 |
| WO | WO-2015133070 A1 | 9/2015 |
| WO | WO-2016035304 A1 | 3/2016 |

\* cited by examiner

VEHICLE DISPLAY APPARATUS

CROSS REFERENCE TO RELATED APPLICATIONS

This application is a U.S. National Phase Application under 35 U.S.C. 371 of International Application No. PCT/JP2016/002907 filed on Jun. 16, 2016 and published in Japanese as WO 2017/010044 A1 on Jan. 19, 2017. This application is based on and claims the benefit of priority from Japanese Patent Application No. 2015-142166 filed on Jul. 16, 2015. The entire disclosures of all of the above applications are incorporated herein by reference.

TECHNICAL FIELD

The present disclosure relates to a vehicle display apparatus mounted on a vehicle.

BACKGROUND ART

Conventionally, a vehicle display apparatus mounted on a vehicle is known. For example, the vehicle display apparatus disclosed in Patent Literature 1 includes an image display panel that displays an image in a display area.

In this kind of the image display panel, there is a difficulty in displaying an image in a three-dimensional manner and the image is more likely to be displayed in a two-dimensional manner. The vehicle display apparatus disclosed in Patent Literature 1 includes a ring disposed closer to a viewer than the image display panel. The ring functions as a scale.

PRIOR ART LITERATURE

Patent Literature

Patent Literature 1: JP 4787102 B

SUMMARY OF INVENTION

The inventors of the present disclosure established a conception of disposing a tangible body, which has a three-dimensional indicator, such as a scale, between an image display panel and a backlight. The backlight emits light to a display area from a back side of the display panel. When the three-dimensional indicator is viewed through the image display panel, a three-dimensional display is achieved.

While the power source of the vehicle display apparatus is in an off state, it is preferred that the tangible body is invisible to a viewer. In the above-described conception, a silhouette of the tangible body is visible to the viewer through the image display panel. Thus, this configuration may degrade a visual quality.

In view of the foregoing difficulties, it is an object of the present disclosure to provide a vehicle display apparatus enabling three-dimensional display and having improved visual quality.

According to an aspect of the present disclosure, a vehicle display apparatus includes an image display panel, a backlight, and a translucent plate. The image display panel displays an image in a display area. The backlight emits a light in a direction from a back surface of the image display panel toward the display area. The translucent plate has a plate shape and is disposed between the image display panel and the backlight. The translucent plate transmits the light emitted from the backlight. The translucent plate has a three-dimensional indicator configured to be visually recognized through the image display panel, and a periphery portion of the translucent plate is disposed out of the display area.

In the above-described vehicle display apparatus, the translucent plate having a plate shape is disposed between the image display panel and the backlight, and the translucent plate has the three-dimensional indicator. Thus, both the image displayed on the image display panel and the three-dimensional indicator disposed behind the image display panel are visible to the viewer. This configuration can achieve the three-dimensional display.

In the translucent plate, the periphery portion is disposed out of the display area. With this configuration, in the display area, a silhouette of the translucent plate is approximately invisible to the viewer. Thus, existence of the translucent plate is not recognized by the viewer and the visual quality can be improved.

BRIEF DESCRIPTION OF DRAWINGS

The above and other objects, features and advantages of the present invention will become more apparent from the following detailed description made with reference to the accompanying drawings. In the drawings:

FIG. 5 is a diagram schematically showing a cross-sectional view taken along line V-V of FIG. 3, a controller, and the like.

EMBODIMENTS FOR CARRYING OUT INVENTION

Hereinafter, an embodiment for implementing the present disclosure will be described referring to drawings.

Figure 1:
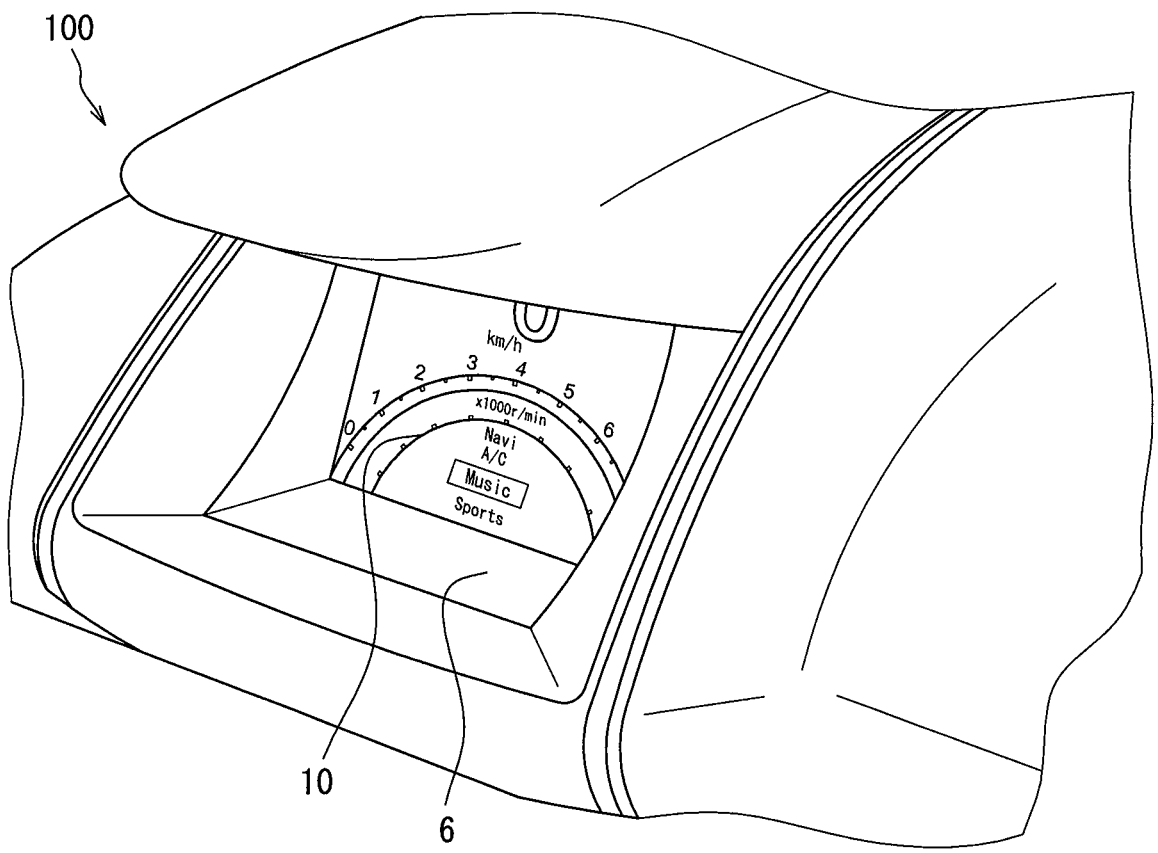
FIG. 1 is a diagram showing a perspective outside view of a vehicle display apparatus according to an embodiment of the present disclosure.

A vehicle display apparatus 100 according to an embodiment of the present disclosure is mounted on a vehicle, and is disposed in an instrument panel facing a seat on which a viewer is seated. The vehicle display apparatus 100 shown in FIGS. 1 and 2 displays information to the viewer in a display area DA. With this configuration, the viewer oriented to the vehicle display apparatus 100 visually perceives the information displayed on the vehicle display apparatus 100. As shown in FIG. 1, the information displayed on the vehicle display apparatus 100 may include a vehicle state, such as vehicle speed, engine speed, fuel remaining amount, battery remaining amount, engine cooling water temperature, lubricating oil temperature, or a position of a shifting gear. The vehicle display apparatus 100 may display various kinds of information, such as a different vehicle state, road information, visibility assist information, or electronic mail by changing a layout of the display area DA.

Figure 3:
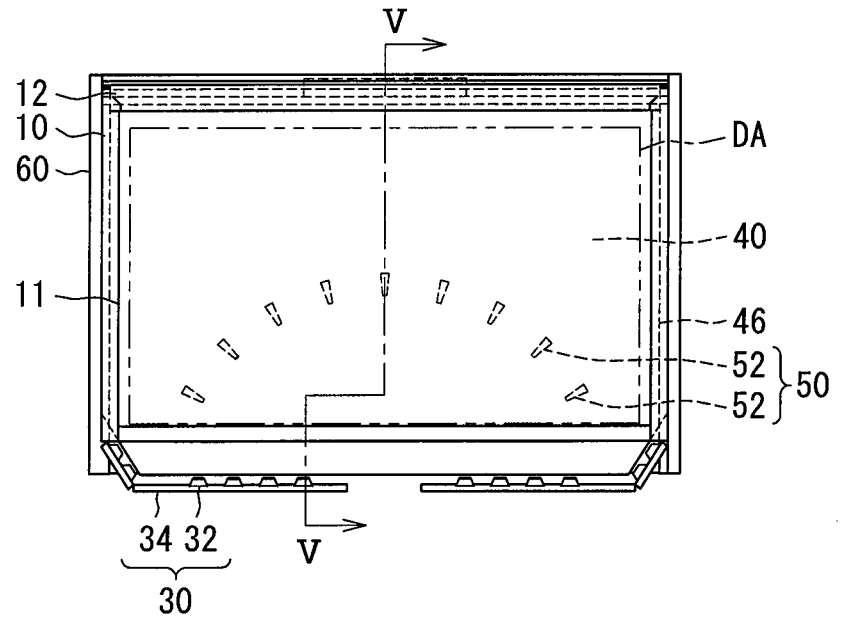
FIG. 3 is a diagram showing a front view of an image display panel, a translucent plate, and a backlight according to the embodiment of the present disclosure.
Figure 4:
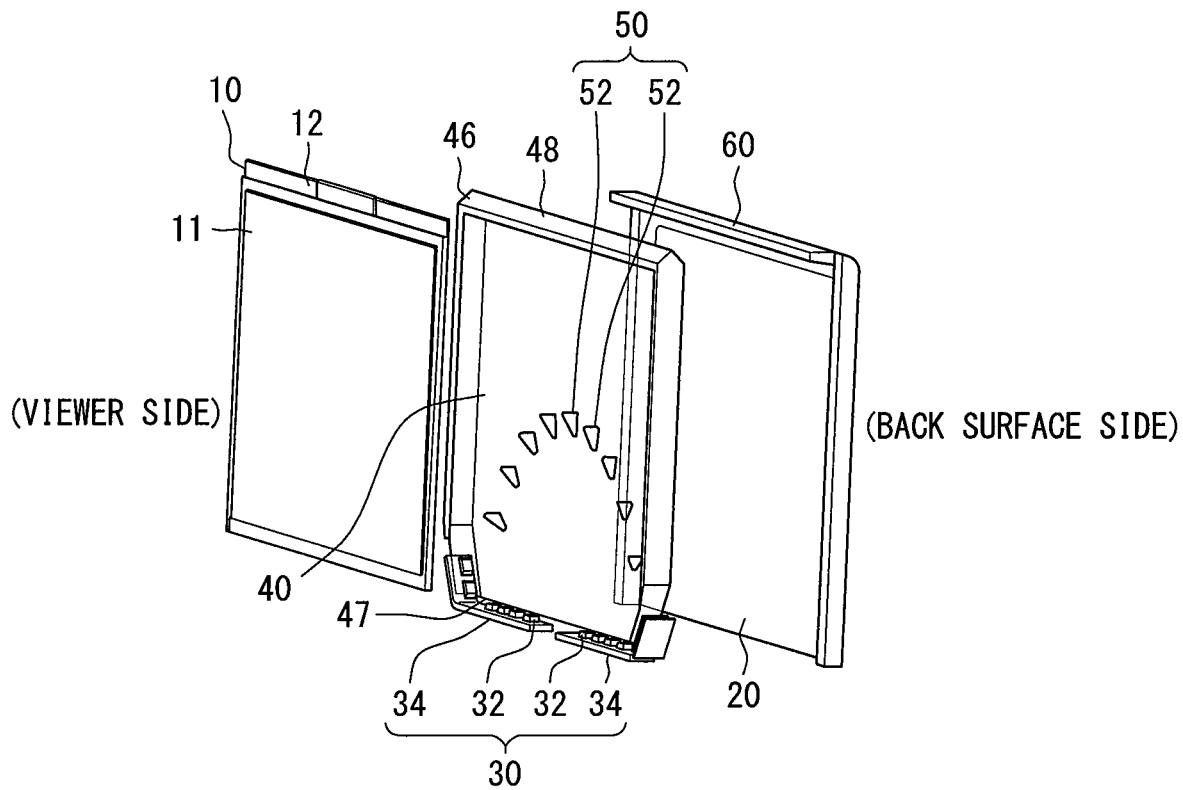
FIG. 4 is a diagram showing an exploded perspective view of the image display panel, the translucent plate, and the backlight according to the embodiment of the present disclosure.
Figure 5:
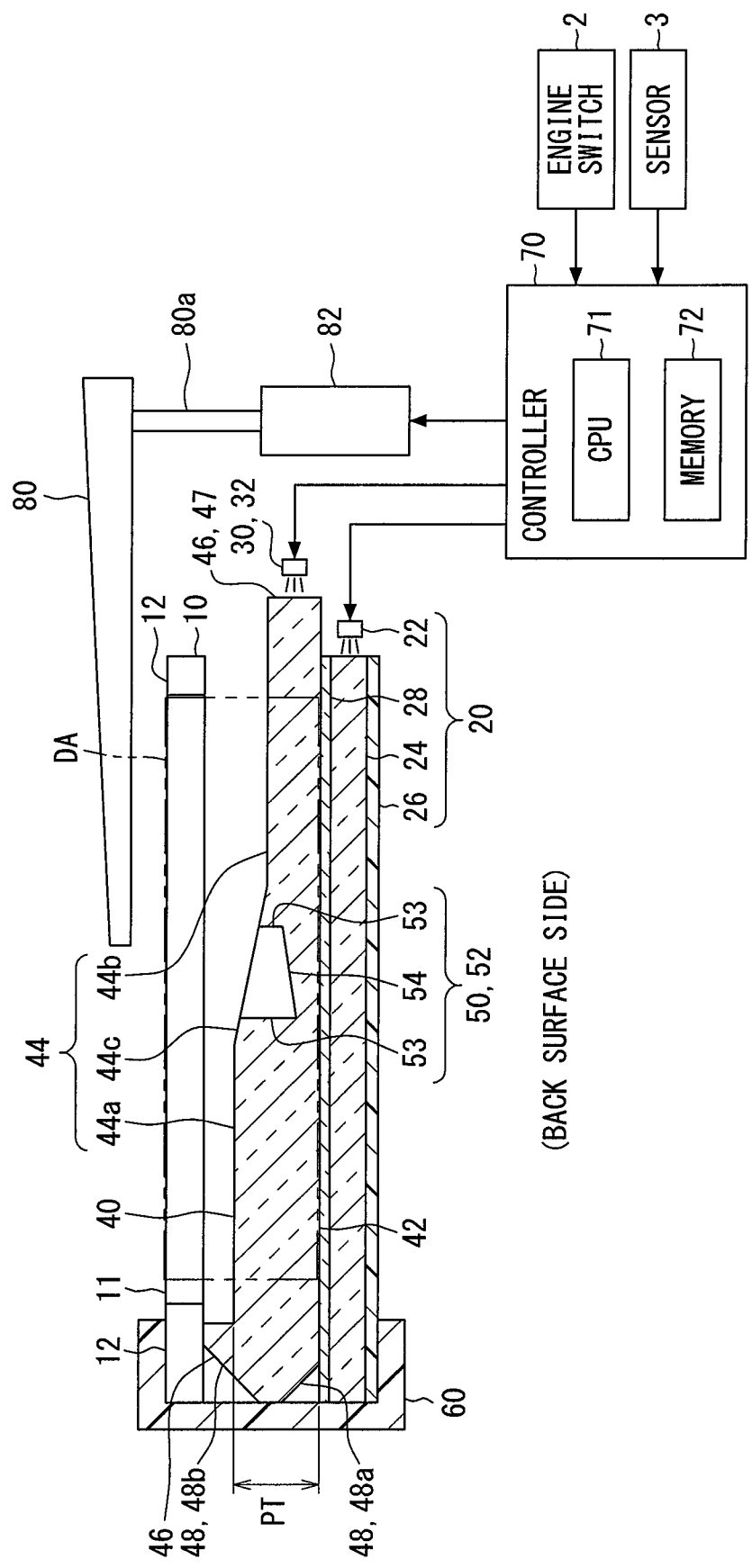

As shown in FIGS. 3, 4, and 5, the above-described vehicle display apparatus 100 mainly includes an image display panel 10, a backlight 20, a light source 30, a translucent plate 40, and a controller 70.

The image display panel 10 is provided by a display element having a panel shape and capable of displaying an image. The image display panel 10 is disposed approximately at a center of the vehicle display apparatus 100. In the present embodiment, the image display panel 10 is provided by an active matrix crystal liquid panel. The active matrix crystal liquid panel is a transmissive liquid crystal panel employing a thin film transistor (TFT). The active matrix crystal liquid panel includes multiple pixels arranged in a two-dimensional direction on a display surface 11.

Specifically, in the image display panel 10, a crystal liquid layer is sandwiched between a pair of polarization films whose polarization axes are substantially perpendicular to each other. In the crystal liquid layer, each liquid crystal is sealed between a corresponding pair of transparent electrodes, and each pair of transparent electrodes for each pixel is independently controllable from one another.

In the above-described image display panel 10, a TN mode is employed. When the voltage between the pair of transparent electrodes is equal to or lower than a predetermined value, an orientation direction of the crystal liquid sandwiched between the transparent electrodes is twisted based on a rubbing direction of an orientation film. In this condition, light entering the image display panel 10 transmits through the image display panel 10. When the voltage between the pair of transparent electrodes is equal to or higher than the predetermined value, the twisted orientation direction of the crystal liquid in the transparent electrodes is canceled. In this condition, the light entering the image display panel 10 is blocked by the image display panel 10. With this configuration, a transmission rate of each pixel changes corresponding to the voltage between the pair of transparent electrodes.

A frame 12 configured to block the light transmission is disposed out of the display surface 11 in the image display panel 10. In the frame 12, a circuit for controlling the transparent electrodes or the like is implemented. The circuit controls the transmission rate of the light that transmits through each pixel. Herein, the light is emitted from the backlight 20 disposed closer to a back surface of the image display panel 10 than the display surface 11. With this configuration, the image display panel 10 is capable of displaying the image to the viewer. The image display panel 10 in the present embodiment has color filters of red, green, and blue so as to be capable of displaying a color image.

Figure 2:
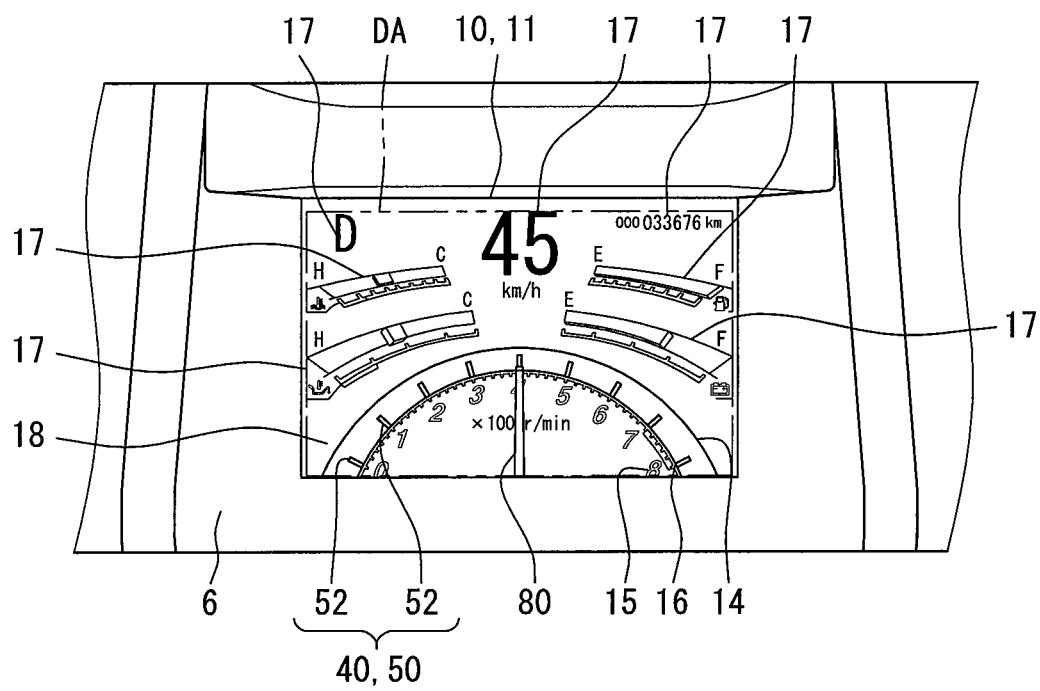
FIG. 2 is a diagram showing a front view of the vehicle display apparatus in a three-dimensional display mode according to the embodiment of the present disclosure.

For example, as shown in FIG. 2, in the image display panel 10, a display area DA, which is a part of the display surface 11, displays images 14, 15, 16, 17 (described below). Herein, the display area DA is defined as an area except for an outer part of the display surface 11 in which the image is not displayed.

As shown in FIG. 5, the backlight 20 includes light emitting elements 22, a light guide plate 24, a reflection plate 26, and a diffusion plate 28. The light emitting elements 22 may be provided by white light emitting diodes. The multiple light emitting elements 22 are disposed to be capable of emitting the light to a side of the light guide plate 24. The light guide plate 24 may be made of synthetic resin, and has a translucent plate shape. The reflection plate 26 may be made of the synthetic resin, has a plate shape, and is attached to a back surface of the light guide plate 24. The diffusion plate 28 may be made of the synthetic resin, has a plate shape, and is attached to a viewer side surface of the light guide plate 24. The light entering into the light guide plate 24 is reflected on the reflection plate 26, diffused in the diffusion plate 28, and output from the viewer side of the backlight 20. With this configuration, the backlight 20 emits the light in a direction from the back surface side toward the display surface 11 of the image display panel 10.

The light source 30 is separated from the backlight 20, disposed out of a periphery portion 46 of the translucent plate 40, and includes multiple light emitting elements 32. Each light emitting element 32 is provided by, for example, a white light emitting diode, supported by a support plate 34, and disposed facing a light input side surface 47 of the translucent plate 40, which will be described below. In FIGS. 3 and 4, the partial multiple light emitting elements 32 are denoted by symbols.

The translucent plate 40 is disposed between the image display panel 10 and the backlight 20, made of the synthetic resin, such as acrylic resin, has a translucent characteristic, and has a plate shape. The translucent plate 40 includes a back surface 42, which faces a back side, and a viewer side surface 44, which faces the viewer side. Both of the back surface and the viewer side surface are provided by smooth mirror surfaces. The light emitted from the backlight 20 is transmitted through the translucent plate 40, and input to the image display panel 10. Herein, the partial light input to the image display panel 10 transmits through the image display panel 10 so that the image can be visually recognized by the viewer.

As shown in FIG. 3, the above-described periphery portion 46 of the translucent plate 40 has an approximately rectangular frame shape, and is disposed out of the display area DA. In the present embodiment, the periphery portion 46 is disposed out of the display surface 11, and is covered by the frame 12 so that the periphery portion 46 is invisible to the viewer.

In the translucent plate 40, the light input side surface 47 is disposed on a part of the periphery portion 46 which faces the light source 30. The light input side surface 47 is set to be substantially perpendicular to a direction in which the light source 30 emits the light, and is provided by a smooth mirror surface. With this configuration, the light input side surface 47 enables the light from the light source 30 to enter into the translucent plate 40 efficiently.

In the periphery portion 46 of the translucent plate 40, which has the frame shape, an edge opposite to the light input side surface 47 has an incline 48. As shown in FIG. 5, the incline 48 has an inclined surface 48a angled at, for example, 45 degrees against the viewer side surface 44, and an inclined surface 48b angled at, for example, 45 degrees against the back surface 42. The inclined surface 48a and the inclined surface 48b may be provided by smooth mirror surfaces, and may be angled at, for example, 90 degrees with each other. The translucent plate 40 is disposed between the inclined surface 48a and the inclined surface 48b.

Remaining three edges of the periphery portion 46 of the translucent plate 40 except for the edge having the light input side surface 47 are protruded from the viewer side surface 44 toward the viewer side, and are in contact with the frame 12. Thus, the remaining three edges of the periphery portion 46 function as a base of the frame 12. A bezel 60 is fixed by a double sided tape. The bezel 60 encloses respective edges of the backlight 20, the translucent plate 40, and the image display panel 10. The frame 12 is sandwiched between the base of translucent plate 40 and the bezel 60.

In the translucent plate 40, the back surface 42 has a flat shape. The viewer side surface 44 has a flat portion 44a, another flat portion 44b, and a thickness change portion 44c disposed between the flat portion 44a and another flat portion 44b. The flat portion 44a is disposed close to the incline 48, and has a flat surface. Another flat portion 44b is disposed close to the light input side surface 47, and has a flat surface. As shown in FIG. 5, the thickness change portion 44c is smoothly connected with the flat portion 44a and another flat portion 44b. Herein, the thickness change portion 44c is inclined toward the viewer side from another flat portion 44b to the flat portion 44a. In this configuration, in the thickness change portion 44c, a thickness PT (see FIG. 5) of the translucent plate 40 increases from a thickness identical to a thickness of another flat portion 44b to a thickness identical to a thickness of the flat portion 44a. The thickness PT of the flat portion 44a is greater than the thickness PT of another flat portion 44b. The thickness change portion 44c has an arc shape which extends from an end of the light input side surface 47 to the other end of the light input side surface 47 through a center of the display area DA. Both ends of the light input side surface 47 are disposed out of the display surface 11.

The translucent plate 40 has a three-dimensional indicator 50 configured to be displayed through the image display panel 10. The three-dimensional indicator 50 of the present embodiment is formed as a recessed portion recessed from the thickness change portion 44c of the viewer side surface 44 of the translucent plate 40. The three-dimensional indicator 50 includes multiple three-dimensional scales 52 provided by recessed portions arranged along the arc shape of the thickness change portion 44c. Each three-dimensional scale 52 has a side wall 53 and a bottom surface 54. Each side wall 53 is extended from the viewer side surface 44 toward the back surface along a direction substantially perpendicular to an arrangement direction of pixels of the image display panel, and has a smooth mirror surface. With this configuration, each side wall 53 can be visually recognized as an outline of the three-dimensional scale 52 by the viewer. Each bottom surface 54 is inclined toward the back surface from another flat portion 44b to the flat portion 44a, and is provided by a smooth mirror surface. With this inclined bottom surface 54, light from the light input side surface 47 is more likely to enter the bottom surface 54. When the light source 30 emits the light, each bottom surface 54 can be visually recognized as if each bottom surface 54 emits the light.

During the above-described emission of the light by the light source 30, partial light output from the light input side surface 47 may arrive at the periphery portion 46 except for the light input side surface 47, and the periphery portion 46 is illuminated by the light. In the above configuration, the periphery portion 46 is covered by the frame 12 of the image display panel 10. Thus, the periphery portion 46 illuminated by the light is invisible to the viewer. The light that arrives at the incline 48 of the periphery portion 46 returns after successively reflecting on respective inclined surfaces 48a, 48b (see FIG. 5). With this configuration, the light from the light source 30 transmitting through the translucent plate 40 is used for illumination of the three-dimensional indicator 50. In FIGS. 2, 3, and 4, a part of the three-dimensional indicator 50 and each three-dimensional scale 52 are denoted by symbols.

A pointer 80 is disposed closer to the viewer than the image display panel 10, and points the three-dimensional indicator 50 to display a condition level of the vehicle. The pointer 80 is provided by a tangible body and has a needle shape. The pointer 80 rotates around a rotating shaft 80a when driven by a stepping motor 82 disposed out of the light source 30. The stepping motor 82 and the rotating shaft 80a are disposed behind an exterior 6, and thus, invisible to the viewer.

A controller 70 schematically shown in FIG. 5 is provided by an electronic circuit which is implemented on a substrate and includes a CPU 71, a memory 72, or the like. The CPU 71 is capable of executing various kinds of processes to run a computer program stored in the memory 72. The memory 72 stores an image data to be displayed by the image display panel 10.

The above-described controller 70 is capable of communicating with an engine switch 2 and various kinds of sensors 3. The controller 70 is capable of outputting an electric signal to the image display panel 10, the backlight 20, the light source 30, and the stepping motor 82 in response to an input of the electric signal from the engine switch 2 or the various kinds of sensors 3. With this configuration, the image displayed on the image display panel 10, turn-on or turn-off of the backlight 20, turn-on or turn-off of the light source 30, and a rotation of the pointer 80 can be independently controlled.

In the vehicle display apparatus according to the present embodiment, during an off state of the engine switch, each of the backlight 20 and the light source 30 is in an off state, and the voltage between the pair of transparent electrodes in each pixel of the image display panel 10 is lower than the predetermined value.

Figure 6:
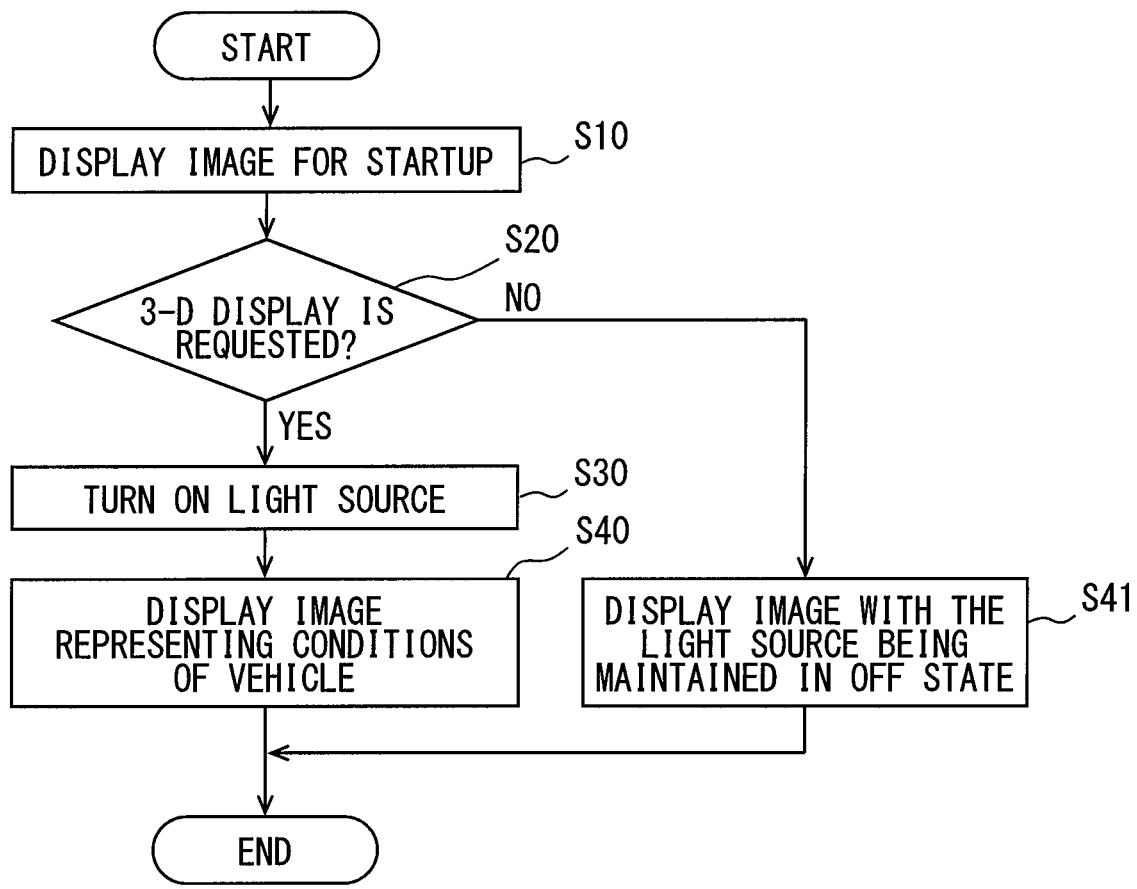
FIG. 6 is a flowchart showing a control executed by the controller according to the embodiment of the present disclosure.

Under the above-described situation, when the engine switch 2 turns on, the controller 70 runs a computer program so that the apparatus 100 starts a control process according to the flowchart in FIG. 6.

In step S10, the flowchart turns on the backlight 20 and displays an image for a startup, such as "WELCOME" on the image display panel 10. After the process in step S10 is executed, the flowchart is shifted to step S20.

In step S20, the flowchart determines whether a three-dimensional display is requested or not. A request for the three-dimensional display is determined based on the information inputted from the various kinds of sensors 3. When the flowchart in step S20 determines the three-dimensional display is requested, the flowchart is shifted to step S30. When the flowchart in step S20 determines the three-dimensional display is not requested, the flowchart is shifted to step S41.

In step S30, the flowchart turns on the light source 30 to perform the three-dimensional display. With this configuration, each three-dimensional scale 52 of the three-dimensional indicator 50 becomes clearly visible to the viewer. After the process in step S30 is executed, the flowchart is shifted to step S40.

In step S40, as shown in FIG. 2, the flowchart displays images 14, 15, 16, 17 that represent the conditions of the vehicle in the display area DA to perform the three-dimensional display. The images 14, 15, 16 that represent the engine speed are displayed corresponding to the three-dimensional indicator 50. Specifically, the foreground image 14, which has the arc shape and decorates the three-dimensional scales 52, is displayed by pixels facing the three-dimensional scales 52 formed on the thickness change portion 44c. The number images 15 and the sub-scale images 16 are displayed by the pixels which are disposed facing another flat portion 44b and adjacent to the foreground image 14. The pointer 80 rotates in response to the input signal from the sensor, which detects the engine speed and is included in the various kinds of sensors 3. The pointer 80 is disposed in accordance with the three-dimensional scales 52 and the images 14, 15, 16. Other images 17 may show various kinds of conditions of the images.

A background area 18 is displayed in black color by the pixels. The pixel has a minimum transmission rate under the black color. The background area 18 is a remaining area of the display surface 11 except the display area DA. No image is displayed in the background area 18. When the foreground image 14 is displayed by pixels facing the three-dimensional scales 52, the foreground image 14 has a higher transmission rate than the background area 18 that displays no image. With this configuration, reduction of brightness of the light, which is reflected on each three-dimensional scale 52, is restricted, and contrast between each three-dimensional scale 52 and the background 18 is emphasized.

In step S41, because the three-dimensional display is not requested, the predetermined image is displayed with the light source 30 being maintained in the off state. In each pixel facing the thickness change portion 44c where each three-dimensional scale 52 is formed, the transmission rate of the pixel is preferably set to be lower than a transmission rate of the pixel in step S40.

(Advantages)

The following will describe advantages obtained by the above-described configuration of the present embodiment.

The translucent plate 40, which has the plate shape and is disposed between the image display panel 10 and the backlight 20, has the three-dimensional indicator 50. The viewer can visually recognize the images 14, 15, 16, 17 displayed by the image display panel 10, and the three-dimensional indicator 50 configured to be displayed through the image display panel 10. This configuration can achieve a three-dimensional display.

The image display panel 10 is controlled such that the transmission rate of the area corresponding to the three-dimensional indicator 50 is higher than the transmission rate of other area, such as the background 18. With this configuration, the three-dimensional indicator 50 that is positioned behind the image display panel 10 can be clearly visible to the viewer.

Herein, the periphery portion 46 of the translucent plate 40 is disposed out of the display area DA. With this configuration, in the display area DA, a silhouette of the translucent plate 40 is approximately invisible to the viewer. Thus, existence of the translucent plate 40 is not recognized by the viewer and the visual quality can be improved.

In the present embodiment, the three-dimensional indicator 50 is formed as a recessed portion recessed from the surface close to the viewer side of the translucent plate 40. Thus, in an arrangement of the translucent plate 40, for example, interference between the three-dimensional indicator 50 and the image display panel 10 or interference between the three-dimensional indicator 50 and the backlight 20 can be restricted. With this configuration, in the vehicle display apparatus 100, the three-dimensional image can be displayed favorably with a simple structure.

In the present embodiment, the light source 30 other than the backlight 20 illuminates the three-dimensional indicator 50 through the translucent plate 40. With this configuration, the three-dimensional indicator 50 can be displayed clearly in emphasized manner even though the images 14, 15, 16, 17 are displayed on the display panel. Suppose that the periphery portion 46 of the translucent plate 40 is illuminated by the light source 30 which is used for illuminating the three-dimensional indicator 50. In this case, because the periphery portion 46 is disposed out of the display area DA, the existence of the translucent plate 40 is not perceived by the viewer. Thus, the image can be displayed favorably.

In the present embodiment, the periphery portion 46 of the translucent plate 40 has the light input side surface 47 and the incline 48. The light output from the light source 30 enters the light input side surface 47 of the periphery portion 46, and transmits toward inside of the translucent plate 40. The incline 48 is disposed opposite to the light input side surface 47. Herein, the three-dimensional indicator 50 is disposed between the light input side surface 47 and the incline 48. The incline 48 has the inclined surface 48a and the inclined surface 48b, between which the translucent plate 40 is disposed. Provided that the partial light entered from the light input side surface 47 transmits without passing through the three-dimensional indicator 50, the light: successively reflects on the two inclined surface 48a, 48b; returns from the incline 48 after reflection; and illuminates the three-dimensional indicator 50.

In the present embodiment, the periphery portion 46 of the translucent plate 40 functions as the base, and is in contact with the image display panel 10. In this configuration, because the image display panel 10 is supported by the base, the image display panel 10 is prevented from moving with respect to the translucent plate 40. Thus, the images 14, 15, 16, 17 can be disposed on the intended position, and displayed favorably.

Other Embodiments

The embodiment of the present disclosure has been described above. The present disclosure should not be limited to the above embodiment and may be implemented in various other embodiments and combinations without departing from the scope of the present disclosure.

As a first modification, the three-dimensional indicator 50 may be formed as the recessed portion recessed from the back surface 42. Alternatively, the three-dimensional indicator 50 may be formed as a protruded portion which is protruded from the back surface 42 or from the viewer side surface 44.

As a second modification, the three-dimensional indicator 50 may be provided by other than the three-dimensional scales 52. An indicator light representing a vehicle condition or an indicator functioning as a warning light may be employed as the three-dimensional indicator 50.

As a third modification, the thickness change portion 44c of the translucent plate 40 may be omitted. The translucent plate 40 may have a flat plate shape.

As a forth modification, the periphery portion 46 of the translucent plate 40 may not function as the base. The periphery portion 46 may not have the incline 48.

As a fifth modification, the periphery portion 46 of the translucent plate 40 may be formed on an inner region of the display area DA.

As a sixth modification, the vehicle display apparatus 100 may not include the light source 30 which is disposed separate from the backlight 20.

As a seventh modification, in the three-dimensional display, the pointer 80 may be displayed by a pointer image instead of the tangible body.

As an eighth modification, in the three-dimensional display, the transmission rate of each pixel facing the three-dimensional indicator 50 is lower than the transmission rate of each pixel of the background 18 on which the image is not displayed. For example, when the transmission rate of each pixel facing the three-dimensional indicator 50 is low, the brightness of the three-dimensional indicator 50 can be enhanced by increasing the light emission quantity of the light source 30.

As a ninth modification, the image display panel 10 may employ crystal liquid panel using VA mode or IPS mode as the driving mode. The image display panel 10 may employ the crystal liquid panel other than TFT. The image display panel 10 may employ a translucent organic EL panel other than the crystal liquid panel.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. A vehicle display apparatus comprising:
    an image display panel displaying an image in a display area;
    a backlight emitting a light in a direction from a back surface of the image display panel toward the display area; and
    a translucent plate having a plate shape and disposed between the image display panel and the backlight, and the translucent plate transmitting the light emitted from the backlight,
    wherein
    the translucent plate has a three-dimensional indicator configured to be visually recognizable through the image display panel, and
    a periphery portion of the translucent plate is disposed out of the display area.

2. The vehicle display apparatus according to claim 1, wherein
    the three-dimensional indicator is configured as a recessed portion which is recessed from a surface of the translucent plate.

3. The vehicle display apparatus according to claim 1, further comprising
    a light source illuminating the three-dimensional indicator through the translucent plate,
    wherein the light source is disposed separate from the backlight.

4. The vehicle display apparatus according to claim 3, wherein
    the translucent plate has a light input side surface and an incline,
    the light input side surface is disposed on the periphery portion of the translucent plate, the light output from the light source enters the translucent plate through the light input side surface,
    the incline is disposed on the periphery portion of the translucent plate and opposite to the light input side surface,
    the three-dimensional indicator is disposed between the light input side surface and the incline, and
    the translucent plate is disposed between two inclined surfaces of the incline.

5. The vehicle display apparatus according to claim 1, wherein
    a part of the periphery portion is in contact with the image display panel and functions as a base of the image display panel.

* * * * *